US010355319B1

(12) United States Patent
Lim et al.

(10) Patent No.: US 10,355,319 B1
(45) Date of Patent: Jul. 16, 2019

(54) METHODS AND SYSTEMS FOR IMPROVED BATTERY PERFORMANCE

(71) Applicant: Amazon Technologies, Inc., Seattle, WA (US)

(72) Inventors: James Robert Lim, San Jose, CA (US); David Wang, Santa Clara, CA (US); Yuting Yeh, Sunnyvale, CA (US); John Wang, Sunnyvale, CA (US)

(73) Assignee: Amazon Technologies, Inc., Seattle, WA (US)

( * ) Notice: Subject to any disclaimer, the term of this patent is extended or adjusted under 35 U.S.C. 154(b) by 286 days.

(21) Appl. No.: 15/228,696

(22) Filed: Aug. 4, 2016

(51) Int. Cl.
*H01M 10/42* (2006.01)
*H01M 10/48* (2006.01)
*H01M 2/02* (2006.01)
*H01M 10/0525* (2010.01)
*H01M 2/34* (2006.01)

(52) U.S. Cl.
CPC ..... *H01M 10/4257* (2013.01); *H01M 2/0207* (2013.01); *H01M 2/345* (2013.01); *H01M 10/0525* (2013.01); *H01M 10/48* (2013.01); H01M 2010/4271 (2013.01); H01M 2010/4278 (2013.01); H01M 2200/20 (2013.01); H01M 2220/30 (2013.01)

(58) Field of Classification Search
None
See application file for complete search history.

(56) References Cited

U.S. PATENT DOCUMENTS

2012/0133521 A1 * 5/2012 Rothkopf ............. G01R 31/024
340/636.1

FOREIGN PATENT DOCUMENTS

JP 2005285647 A * 10/2005

* cited by examiner

*Primary Examiner* — Daniel S Gatewood
(74) *Attorney, Agent, or Firm* — Eversheds Sutherland (US) LLP

(57) ABSTRACT

Systems, methods, and computer-readable media are disclosed for improved battery performance. The systems, methods, and computer-readable media described herein may improve user experiences and prolong the battery's life. In an example method described herein, a battery may be placed within a clamp or housing that applies configurable pressure to the battery. In turn, the applied pressure may counter the swelling pressure of the battery and improve the battery's power output, reduce the internal resistance or impedance, and improve the life cycle of the battery.

20 Claims, 8 Drawing Sheets ically the ability to enhance the performance of batteries without sacrificing other features similar to the features described above can enhance the user experience and satisfaction. Accordingly, there exists a dire market need for systems and methods that can improve the performance of batteries while maintaining features similar to the features described above.

METHODS AND SYSTEMS FOR IMPROVED BATTERY PERFORMANCE

BACKGROUND

Electronic devices are now an integral part of everyday life. Many of the electronic devices that are widely used are mobile devices (e.g., mobile phones, laptops, tablets, and/or the like). These devices require power to operate. Often power is provided to such devices, at least partially, via a battery. Such batteries may be designed to include different features (e.g., long life, water proofing, small size, and/or the like). Such features may directly relate to the user experience. For example, the battery may define how long an electronic device can operate before recharging. In some instances, different desirable features may be difficult to incorporate into a single battery. For example, the size of a battery may likely limit the amount of charge it can hold or how long an electronic device can operate without recharging.

Naturally the ability to enhance the performance of batteries without sacrificing other features similar to the features described above can enhance the user experience and satisfaction. Accordingly, there exists a dire market need for systems and methods that can improve the performance of batteries while maintaining features similar to the features described above.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. The use of the same reference numerals indicates similar, but not necessarily the same or identical components. Different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Overview

Figure 1A:
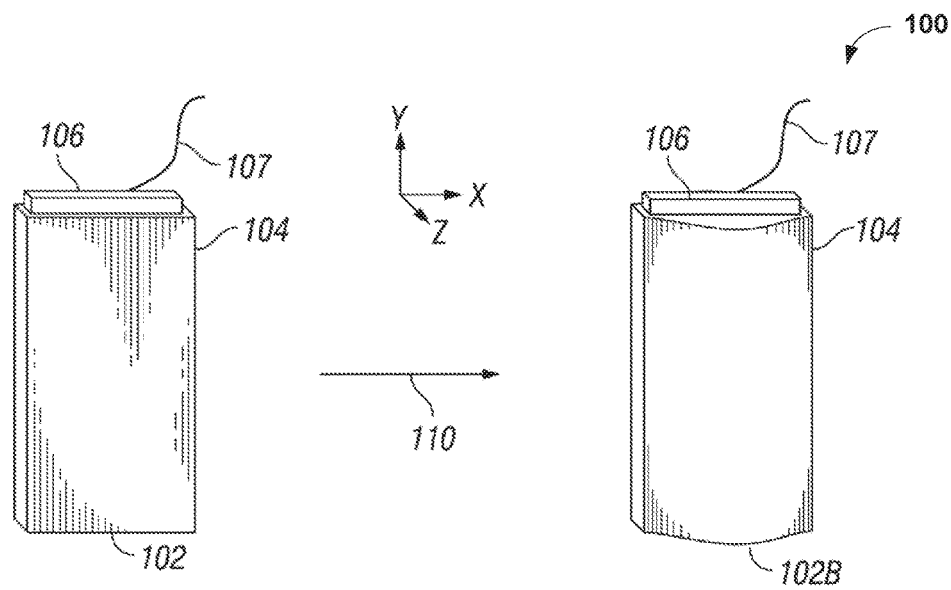
FIGS. 1A-1B illustrate an environment where one or more devices may operate in accordance with one or more example embodiments of the disclosure.

This disclosure relates to, among other things, systems, methods, computer-readable media, techniques, and methodologies for improving pouch batteries performances. Generally, a battery (e.g., pouch battery) may be configured to facilitate powering mobile electronic devices (e.g., mobile phones, tablets, remote controllers and/or the like) and/or other electronic devices (desktop computers, alarm systems, and/or the like).

Pouch batteries may have one or more elastic surfaces (e.g., elastic shell). For example, a top and bottom portions of a pouch battery may be less rigid than those of a solid battery. Therefore, pouch batteries may experience swelling over time. For example, over time the pouch battery may appear inflated or ballooned. In some implementations, such inflation or ballooning effects may be referred to as swelling and/or battery swelling. In some implementations, swelling may occur or be more severe due to pouch batteries being subjugated or exposed to vacuum conditions. For example, pouch batteries may be exposed to vacuum pressure during one or more processing events (e.g., water resistance processing). During such processing, pouch batteries may experience swelling. Generally swelling degrades the performance of the pouch batteries (e.g., increase internal impedance, reduce the power output, reduce the life cycle, and/or the like). Such problems may, for example, cause pouch batteries to provide less power than desirable to electronic devices or cause electronic devices to experience power failures. In turn, these problems may reduce the overall quality of the pouch batteries and degrade the user experience. Similarly, experiencing problems such as swelling during processing events may render some pouch batteries nonfunctional and in turn may increase the production costs associated with manufacturing pouch batteries.

Embodiments of the disclosure may improve the user experience and reduce battery failures by applying a configurable pressure to the pouch batteries. In one implementation, pressure may be applied by a battery clamp or comparable mechanisms for applying pressure. In a different implementation, the pressure may be applied using a housing element for the battery or a housing element for the battery and an electronic device (e.g., phone cover). The pressure may be applied to a portion (e.g., cell body) of the pouch battery. Such pressure may enhance pouch batteries performances by extending their respective life due to increased electrode stack pressure which prevents electrode delamination and capacity fade problems, for example, during vacuum or low pressure processes. In some implementations, a pressure sensor (e.g., sensor sheet) may be interposed between a pressure applying device (e.g., the clamp, the housing, and/or the like) and a pouch battery. The pressure sensor allows for a computing entity and/or circuitry (e.g., management circuitry) to determine and differentiate between the swelling pressure and the applied pressure. The swelling pressure (sometimes referred to as swell pressure) may be an internal pressure of the battery and may cause the swelling of the battery. In one example, the swelling pressure may be caused by expansion of solid materials. In one example, the swelling pressure may be caused by expansion or release of a gaseous material within the battery. The swelling pressure may cause the battery swelling as described herein. The pressure sensor may provide pressure data indicative of the overall pressure. In some implementations, the computing entity or circuitry (e.g., management circuitry) may dynamically adjust the applied pressure by the pressure applying device based on the measured swelling pressure or the equivalent corresponding battery dimensional changes. In some implementations, the computing entity or circuitry (e.g., management circuitry) may provide an indication that a battery is not functioning or is due for replacement based on the swelling pressure exceeding a configurable threshold.

Similarly fixed or dynamic pressure may be applied to pouch batteries during event processing (e.g., water resistance processing) to reduce swelling during the event processing. For example, pressure may be externally applied to pouch batteries when they are exposed to vacuum conditions. As described above, the pressure applied may be dynamically adjusted based on the vacuum pressure applied to the pouch battery and/or the swelling of the pouch battery. In turn, these implementations may reduce or eliminate the problems described above.

Figure 1B:
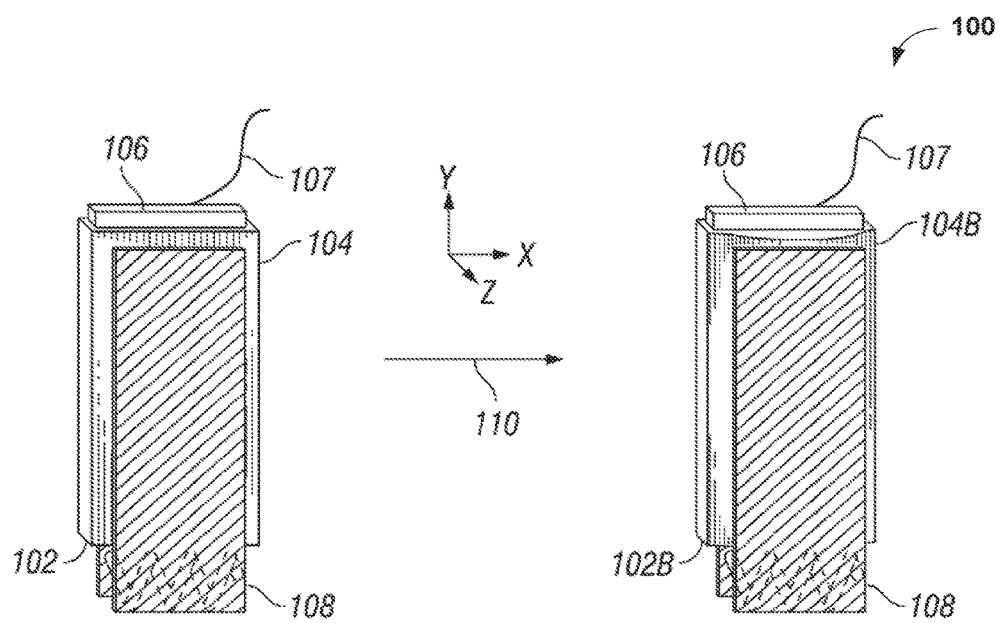

FIGS. 1A-1B illustrate an environment 100 where one or more devices may operate in accordance with one or more example embodiments of the disclosure. A battery 102 may contain a cell body portion 104 and a circuitry portion 106 (e.g., management circuitry). In some example, a battery may comprise of two or more cells that convert stored chemical energy into electrical energy. Each of the cells may have a positive terminal (e.g., cathode), and a negative terminal (e.g., anode). In some implementations, the battery may contain a separator sheet placed between the battery's the positive terminal and the negative terminal. The battery cell body may be, for example, a soft shell that contains the two or more cells and the separator sheet. In some implementations, the battery cell body may be a portion of the battery that does not include circuitry. In some implementations, the battery cell body may be all portions of the battery that do not include circuitry. In one implementation, the battery cell body may comprise a solid electrolyte material (e.g., superionic conductors and/or fast ion conductors). For example, the battery may comprise a solid oxide fuel cell configured to produce electricity from oxidizing a fuel. In on implementation, the fuel may comprise solid enterocyte materials. The circuitry portion 106 may be connected to terminals 107 configured for connection to an electronic device to provide power. In one implementation, the battery may be a single cell battery. In some implementations, the battery may be a multiple cell battery. In one implementation, the battery may be a lithium ion cell battery or a lithium ion pouch battery. In some implementations, the cell of the lithium ion pouch battery may be cylindrical, prismatic, or a pouch unit. In some implementations, the battery may be a car battery. In the depicted implementation, the battery 102 is a lithium ion pouch battery.

The circuitry portion 106 (e.g., management circuitry) may be a protection circuitry module (PCM). The PCM may be configured, for example, to protect lithium ion pouch batteries from overcharge current, overdischarge current, overvoltage, undervoltage, over-temperature, and short-circuits. In turn, the PCM prevents lithium ion pouch batteries from malfunctioning and causing, for example, fire or explosive damage. In some implementations, the circuitry portion 106 may monitor the performance of a plurality of battery cells to ensure safe operation. The circuitry portion 106 may be an electronic system that manages a rechargeable battery (e.g., cell, battery pack, and/or the like). For example, the circuitry portion 106 or other circuitry of the battery may monitor the battery state, calculate secondary data, provide reporting signals, and provide protection functions. The circuitry portion 106 may, for example, monitor the battery's total voltage or the voltage of the individual cells, the overall battery temperature or the temperatures of individual cells, the charge level and the state of the battery, measurements indicative of the overall condition of the battery, the current output, and/or the like.

In some implementations, the cell body portion 104 of the battery 102 may be made from soft, elastic or non-rigid materials. For example the cell body portion 104 may have an elastic or soft shell. In one implementation, the elastic or soft shell may be made from laminate material. In some implementations, the pouch cell material may comprise of an aluminum foil material interposed between two polymer layers. The aluminum foil material may function as a barrier against permeation, into and out of the battery cell, including water diffusion. The outside polymer layer may function as a mechanical protection and the inner polymer may function as a chemical protection. The inner polymer layer may comprise, for example, polypropylene (PP) while the outer polymer layer may comprise, for example, polyamide (PA) and/or polybutylene terephthalate (PBT). In some implementations, the inner polymer layer may comprise a PET like material or a derivative thereof. The pouch cells may be formed by thermal welding of the edges during which the inner polymer layers are joined together. To ensure an air tight seal around the connectors, additional materials may be used. The inner thermoplastic polymer welds may block diffusion of water and air from the outside, as well as act as a barrier for electrolytes. Other materials, similar to the materials described herein, may be used to create soft or elastic shells for lithium ion batteries.

When subjugated to a processing event 110, the cell body portion 104 or the battery 102B may swell or appear bloated or overfilled 104B or 102B because of swelling pressure. In some implementations, swelling of the cell body 104B may occur over time as the battery ages. In some implementations, swelling may be caused by one or more processing events. For example, a lithium ion pouch battery may swell when the battery is exposed to vacuum pressure during waterproofing. Other processing events may also cause or contribute to the swelling. In the depicted implementation, the swelling is shown in the direction of the Z axis. In some implementations, the swelling may also occur in the direction of the X axis and/or the Y axis.

To reduce or eliminate the swelling, a pressure applying device may be used to apply external pressure to the cell body portion 104. In one implementation, the pressure applying device may be a clamp 108 that applies pressure to the cell body portion 104 externally as shown in FIG. 1B. In one implementation, the applied pressure may be a configurable pressure that can be adjusted mechanically by a user or automatically by a computing device. The pressure applied (e.g., selected pressure and/or predetermined pressure) may be applied onto the cell body in a direction parallel to an axis defined by the depth of the cell body (Z axis). The pressure applied (e.g., selected pressure and/or predetermined pressure) by the clamp 108 may prevent the cell body from swelling or may reduce the swelling of the cell body as the battery ages. In some implementations, the clamp 108 may continuously apply pressure (e.g., selected pressure and/or predetermined pressure) to the cell body portion 104 inside an electronic device as the battery powers the electronic device. In some implementations, the clamp 108 may be applied to the cell body portion 104 prior to the battery 102 or cell body portion 104 undergoing a processing event 110 (e.g., vacuum exposure for water proofing). In turn, the pressure applied by the clamp 108 may reduce or eliminate the swelling of cell body 104B or battery 102B as shown. In some implementations, the clamp 108 may be removed from applying pressure onto the cell body 104B after completion of the processing event 110. In some implementations, the pressure applied by the clamp 108 may be reduced after completion of the processing event 110. In some implementations, the pressure applied by the clamp 108 may be at least equal to or greater than the vacuum pressure that the cell body portion 104 is exposed to during the processing event 110. For example, a vacuum pressure of 15 mTorr (e.g., negative 15 psi) may require at least a clamp pressure of 15 psi to be applied to the cell body portion 104. A maximum pressure that the cell body portion 104 can withstand may also be determined. For example, the maximum pressure that the cell body portion 104 can withstand may be 35 psi. Accordingly, a configurable pressure (e.g., selected pressure and/or predetermined pressure) between 15 and 35 psi may be applied to the cell body portion 104 via the clamp 108.

Illustrative Device Architecture

Embodiments of the present disclosure may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media includes all computer-readable media (including volatile and non-volatile media).

In one embodiment, a non-volatile computer-readable storage medium may include a floppy disk, flexible disk, hard disk, solid-state storage (SSS) (e.g., a solid state drive (SSD)), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMCs), secure digital (SD) memory cards, SmartMedia cards, CompactFlash (CF) cards, memory sticks or memory apparatus, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises a combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Pressure Applying Device

Figure 2A:
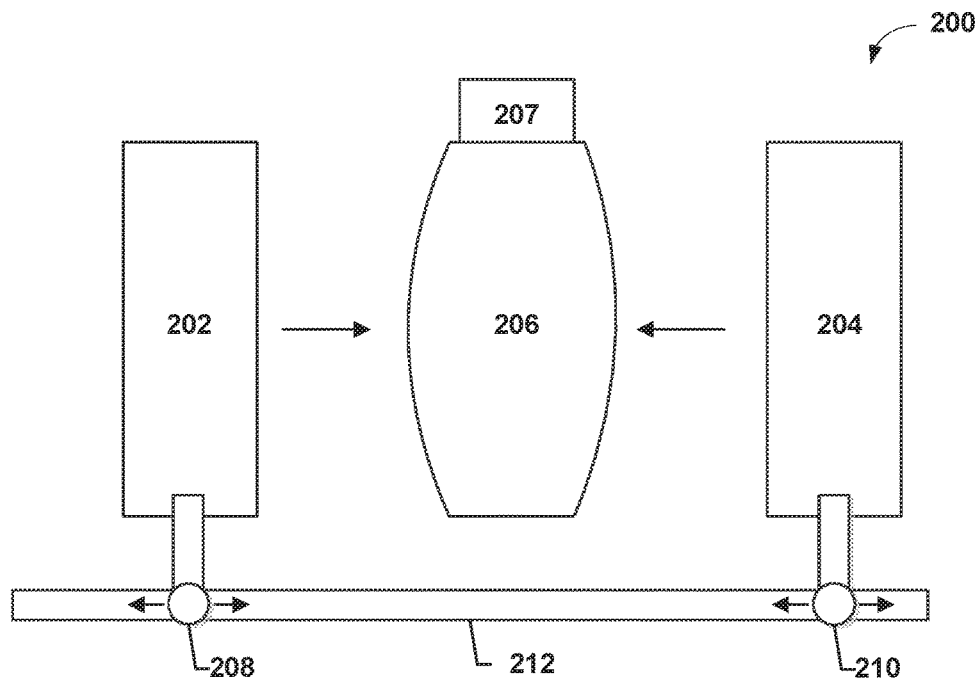
FIGS. 2A-2B illustrate an example cross-sectional view of a device according to one or more example embodiments of the disclosure.
Figure 2B:
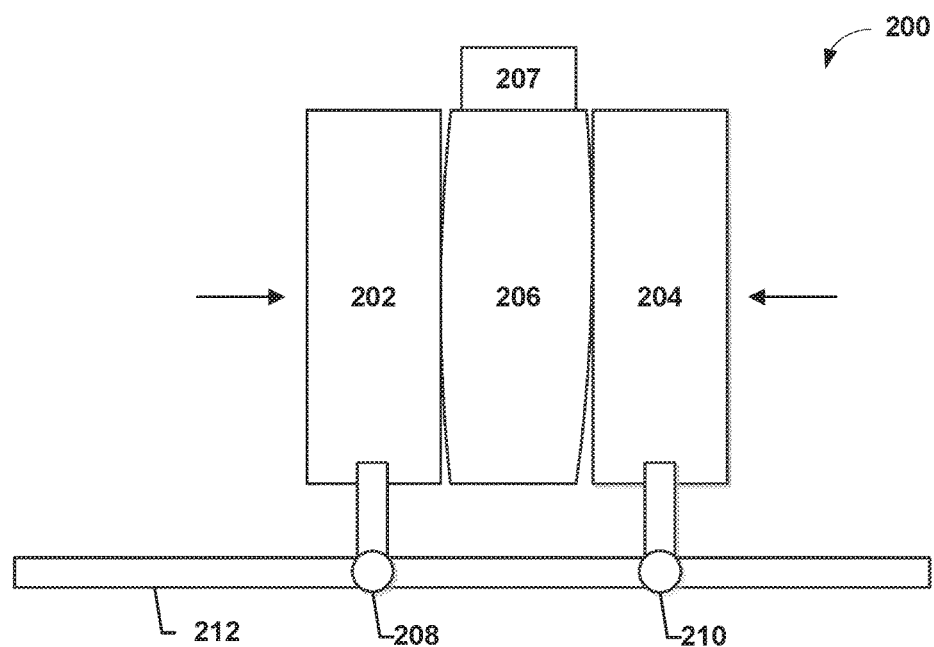

FIGS. 2A-2B illustrate an example cross-sectional view of a pressure applying device 200 according to one or more example embodiment of the disclosure. In some implementations, the pressure applying device 200 may be controlled mechanically by, for example, an operator. In other implementations, the pressure applying device 200 may be controlled automatically via a computing device or entity (not shown).

In general, the terms processing device, computer, entity, system, and/or similar words used herein interchangeably may refer to, for example, one or more computers, computing entities, desktop computers, mobile phones, tablets, phablets, notebooks, laptops, distributed systems, gaming consoles, watches, televisions, dongles, servers or server networks, blades, gateways, switches, processing devices, processing entities, set-top boxes, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. Although the operations described herein may be described with reference to the pressure applying device 200 and/or battery 102 or 206, such operations may be performed by other suitable devices, such as the devices discussed above.

In one implementation, the pressure applying device 200 may include a top pressure applying portion 202 and a bottom pressure applying portion 204. The top and bottom pressure applying portions 202 and 204 respectively may be secured to a rail or a beam such that the top and bottom pressure applying portions 202 and 204 can move along the rail or beam. The top and bottom pressure applying portions 202 and 204 may also be locked in place to apply pressure. In one example, the top and bottom pressure applying portions 202 and 204 may be a clamp as shown in FIGS. 1A-1B. The clamp may be secured to a tensioning device that constantly applies pressure to close the clamp (e.g., coil, spring and/or the like). In other implementations, the top and/or bottom pressure applying portions 202 and 204 may be locked in position to apply pressure. For example, a notch system or a screw tensioning system may be used to apply configurable pressure (e.g., selected pressure and/or predetermined pressure) onto the battery.

In the depicted embodiment of FIG. 2A, the top and bottom pressure applying portions 202 and 204 are secured to a rail 212 via rollers 208 and 210 respectively. The rollers 208 and 210 allow the top and bottom pressure applying portions 202 and 204 to slide along the rail in the directions depicted. In one implementation, the rollers 208 and 210 may be locked in their position such that the movement is not possible when they are locked. In some implementations, the rollers 208 and/or 210 may be motorized. In one implementation, the rollers 208 and/or 210 may be in communication with a computing device or entity that controls the movement of the rollers 208 and 210 automatically. Similarly, the computing device or entity may control locking the rollers 208 and 210 in their position and control the pressure applied by the top and bottom pressure applying portions 202 and 204 of the pressure applying device 200.

As shown in FIG. 2A, a cell body portion 206 of a battery may be positioned between the top and bottom pressure applying portions 202 and 204 of the pressure applying device 200. A circuitry portion 207 (e.g., management circuitry) of the battery may be placed away from the top and bottom pressure applying portions 202 and 204 of the pressure applying device 200, such that the pressure applying device does not apply pressure onto the circuitry portion 207. The circuitry portion 207 may be fragile and applying pressure to the circuitry portion 207 may result in damaging the circuitry portion 207. The battery may be secured in position by a bracket or a mount (not shown) such that the pressure applied by the top and bottom pressure applying portions 202 and 204 is applied onto the cell body portion 206.

As shown in FIG. 2B, as top and bottom pressure applying portions 202 and 204 of the pressure applying device 200 come in contact with the swelling surfaces of the cell body portion 206 of the battery, pressure may be applied onto the surfaces of the cell body portion 206. The pressure applied may reduce the swelling of the surfaces as depicted in FIG. 2B. In one implementation, the rollers 208 and 210 may be locked in place by, for example, a notch mechanism once the desirable configurable pressure (e.g., selected pressure and/or predetermined pressure) is applied. In a different implementation, the rollers 208 and 210 may be motorized rollers controlled by a computing device or entity. The computing device or entity may provide instructions to the motorized rollers to apply a configurable threshold of pressure by moving the top and bottom pressure applying portions 202 and 204 of the pressure applying device 200 accordingly relative to the cell body portion 206. For example, the roller 208 may force the top pressure applying portion 202 to push against a first end of the cell body portion 206 with a first particular force and the roller 210 may force bottom pressure applying portion 204 to push against a second end of the cell body portion 206 such that the overall resultant force causes a configurable pressure (e.g., selected pressure and/or predetermined pressure) to be applied to the cell body portion 206.

In some implementations, the pressure applied onto the cell body portion 206 is between 1 and 15 psi (e.g., 1, 3, 5, 8, 12, 13, and/or the like). In some implementations, the pressure applied onto the cell body portion 206 is between 1 and 30 psi. In one implementation, the pressure applied onto the cell body portion 206 is between 1 and a threshold pressure. The threshold pressure may be the maximum pressure the cell body portion 206 can withstand without being a hazard (e.g., bursting or exploding).

Figure 3A:
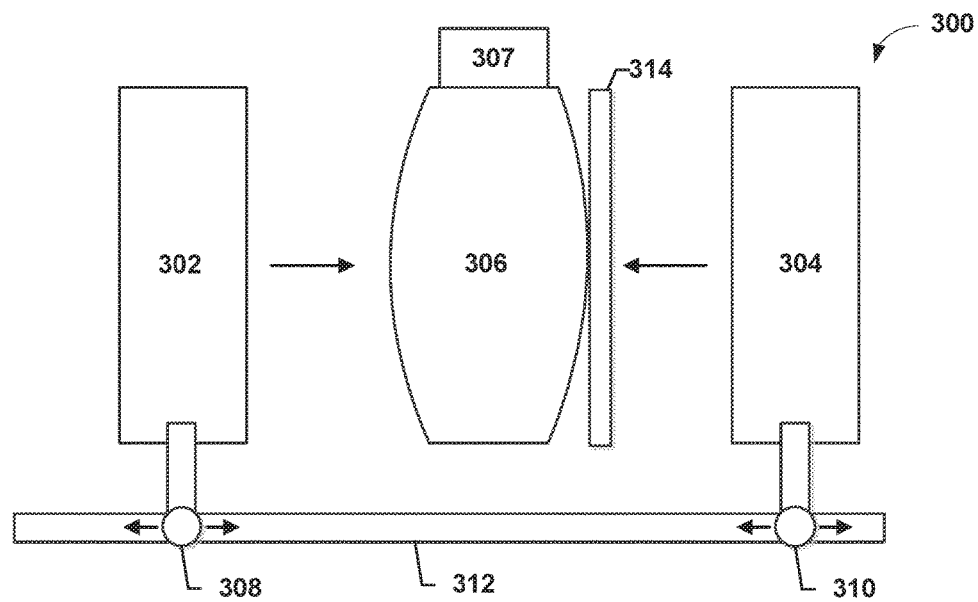
FIGS. 3A-3B illustrate an example cross-sectional view of a device according to one or more example embodiments of the disclosure.
Figure 3B:
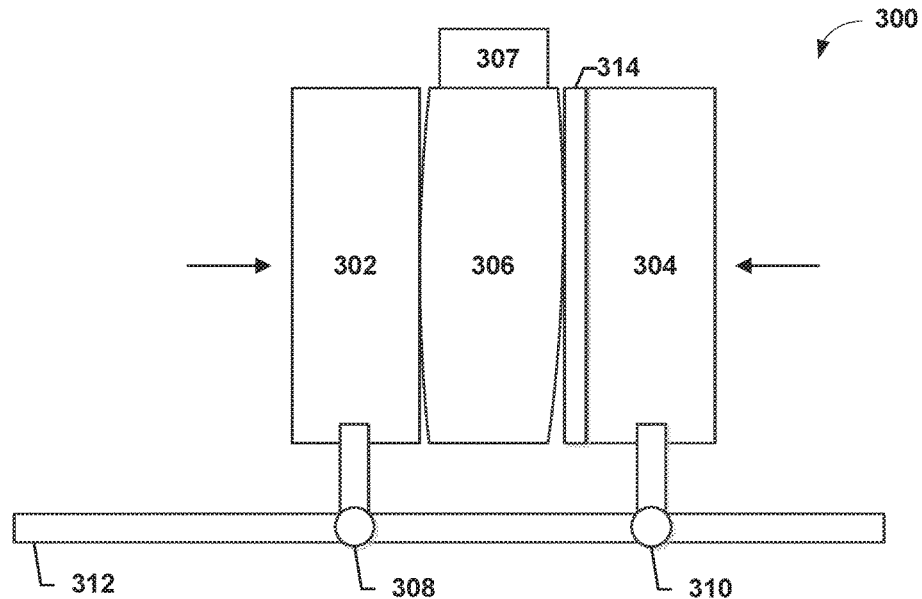

FIGS. 3A and 3B are generally similar to FIGS. 2A and 2B. FIGS. 3A and 3B illustrate an example pressure applying device 300 according to one or more example embodiments of the disclosure. Pressure applying device 300 is generally similar to pressure applying device 200. In some implementations, the pressure applying device 300 may be controlled mechanically by, for example, an operator. In other implementations, the pressure applying device 300 may be controlled automatically via a computing device or entity (not shown).

In one implementation, the pressure applying device 300 may include a top pressure applying portion 302 and a bottom pressure applying portion 304. The top and bottom pressure applying portions 302 and 304 respectively may be secured to rail or a beam such that the top and bottom pressure applying portions 302 and 304 can move along the rail or beam. The top and bottom pressure applying portions 302 and 304 may also be locked in place to apply pressure. In one example, the top and bottom pressure applying portions 302 and 304 may be a clamp as shown in FIGS. 1A-1B. The clamp may be secured to a tensioning device that constantly applies pressure to close the clamp (e.g., coil, spring and/or the like). In other implementations, the top and/or bottom pressure applying portions 302 and 304 may be locked in position to apply pressure. For example, a notch system or a screw tensioning system may be used to apply configurable pressure (e.g., selected pressure and/or predetermined pressure) onto the battery.

In the depicted embodiment of FIG. 3A, the top and bottom pressure applying portions 302 and 304 are secured to rail 312 via rollers 308 and 310 respectively. The rollers 308 and 310 allow the top and bottom pressure applying portions 302 and 304 to slide along the rail in the directions depicted. In one implementation, the rollers 308 and 310 may be locked in their position such that movement is not possible when they are locked. In some implementations, the rollers 308 and/or 310 may be motorized. In one implementation, the rollers 308 and/or 310 may be in communication with a computing device or entity that controls the movement of the rollers 308 and 310 automatically. Similarly, the computing device or entity may control locking the rollers 308 and 310 in their position and control the pressure applied by the top and bottom pressure applying portions 302 and 304 of the pressure applying device 300.

As shown in FIG. 3A, a cell body portion 306 of a battery may be positioned between the top and bottom pressure applying portions 302 and 304 of the pressure applying device 300. A circuitry portion 307 (e.g., management circuitry) of the battery may be placed away from the top and bottom pressure applying portions 302 and 304 of the pressure applying device 300, such that the pressure applying device 300 does not apply pressure onto the circuitry portion 307. The circuitry portion 307 may be fragile and applying pressure to the circuitry portion 307 may result in damaging the circuitry portion 307. The battery may be secured in position by a bracket or a mount (not shown) such that the pressure applied by the top and bottom pressure applying portions 302 and 304 is applied onto the cell body portion 306.

In one implementation, a sensor sheet 314 may be positioned adjacent to a surface of cell body portion 306. For example, as shown in FIG. 3A, the sensor sheet 314 may be interposed between the bottom pressure applying portion 304 and the cell body portion 306. For example, the sensor sheet 314 may be attached to or secured next to the cell body portion 306. Alternatively, the sensor sheet 314 may be attached or secured to one of the top or bottom pressure applying portions 302 and 304 of the pressure applying device 300.

The sensor sheet 314 may be configured to determine pressure applied onto the sensor sheet and, in turn, provide pressure data. In one implementation, the sensor sheet 314 may be utilized to differentiate between the pressure applied by the pressure applying device 300 and the swelling pressure of the cell body portion 306. The circuitry portion 307 or a computing entity (not shown) may be configured to determine the swelling pressure and the overall applied pressure. For example, if the pressure applying device 300 is configured to apply a pressure of 12 psi and the overall pressure measured by the sensor sheet 314 is 9 psi then the circuitry portion 307 or the computing entity may determine that the swelling pressure is currently 3 psi.

As shown in FIG. 3B, as the top and bottom pressure applying portions 302 and/or 304 and/or the sensor sheet 314 of the pressure applying device 300 come in contact with the swelling surfaces of the cell body portion 306 of the battery, pressure may be applied onto the surfaces of the cell body portion 306. The pressure applied may reduce the swelling of the surfaces as depicted in FIG. 3B. In one implementation, the rollers 308 and 310 may be locked in place by, for example, a notch mechanism once the desirable configurable pressure (e.g., selected pressure and/or predetermined pressure) is applied. In a different implementation, the rollers 308 and 310 may be motorized rollers controlled by a computing device or entity. The computing device or entity may provide instructions to the motorized rollers to apply a configurable threshold of pressure by moving the top and bottom pressure applying portions 302 and 304 of the pressure applying device 300 accordingly relative to the cell body portion 306. For example, the roller 308 may force the top pressure applying portion 302 to push against a first end of the cell body portion 306 with a first particular force, and the roller 310 may force bottom pressure applying portion 304 to push against a second end of the cell body portion 306 such that the overall resultant force causes a configurable pressure (e.g., selected pressure and/or predetermined pressure) to be applied to the cell body portion 306.

Figure 4A:
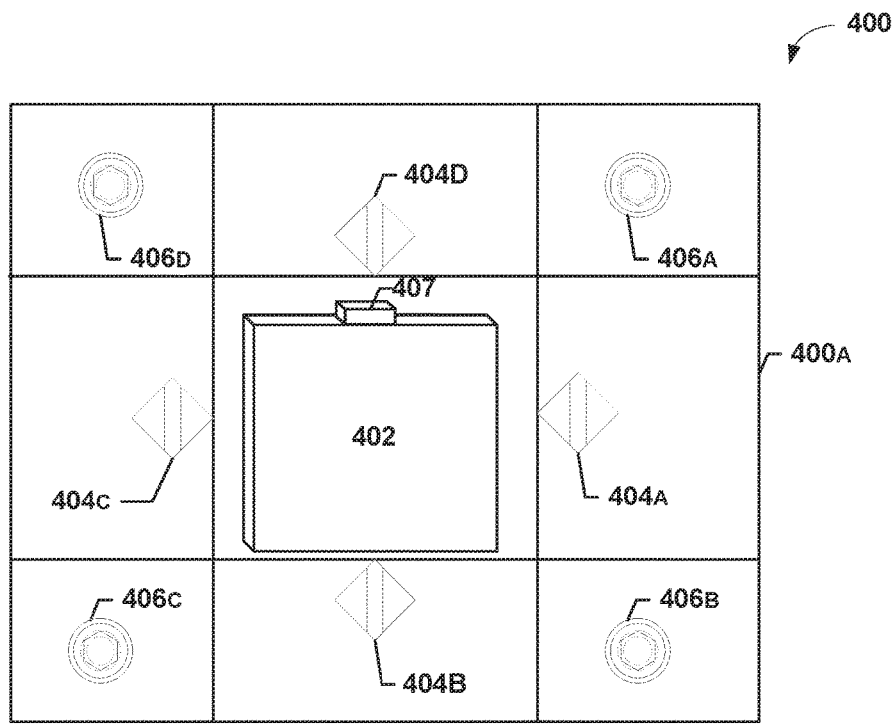
FIGS. 4A-4B illustrate an example top-down view of a device according to one or more example embodiments of the disclosure.
Figure 4B:
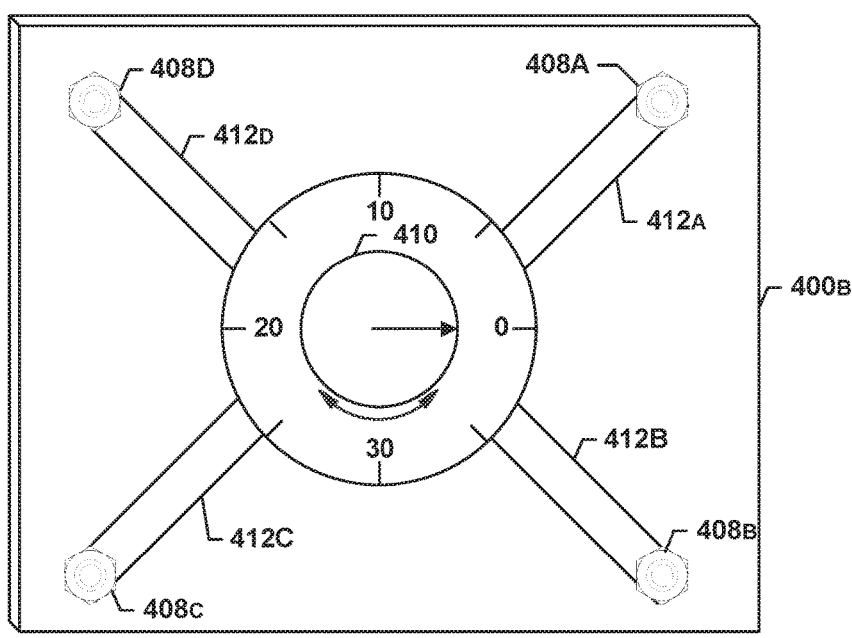

FIG. 4A depicts a tray portion 400A of a pressure applying device 400, while FIG. 4B depicts a cover portion 400B of the pressure applying device 400. The tray portion 400A may include a plurality of protruding elements or portions defining one or more confined areas as shown. The central area may be configured for placement of a battery (e.g., lithium ion pouch battery). In some implementations, the central area may be of a similar size to the battery or the cell body. In one implementation, the central area may be slightly larger than the battery or the cell body. In one implementation, the size of the central area is designed based on the battery to be placed within the pressure applying device.

In some implementations, sensors 404A-404D may be positioned at each protruding element or edge of the central area. In one implementation, the sensors 404A-404D may be proximity sensors. In some implementations, the sensors 404A-404D may provide measurements specifying how close is each respective edge of the battery or the cell body to the respective protruding element or edge. For example, the sensor 404A may measure the edge of the battery 402 closest to the sensor 404A is 5 millimeters apart from the protruding edge closest to sensor 404A. The sensors 404A-404D may provide such measurements to a computing entity (not shown) or to circuitry 407 (e.g., management circuitry). In some implementations, a threshold proximity is set for each protruding element or edge. In one implementation, a threshold proximity may be set for the edge and/or surface near sensor 404A. For example, a threshold of 1 millimeter may be set for the edge and/or surface near sensor 404A. When the cell body 402 swells and expands, it may get closer to the sensor 404A. Once the threshold proximity is exceeded, the pressure may be disabled. For example, once the battery 402 expands and the closest edge to sensor 404A is within 1 millimeter from the closest protruding edge, the application of pressure may be halted. In one implementation, the circuitry 407 and/or the computing entity may provide instructions to the pressure applying device 400 to stop applying pressure onto the cell body 402. Similarly, once the proximity threshold is exceeded, an indication of the battery being due for replacement may be provided by the computing entity and/or the circuitry 407. It should be understood that the sensors 404A-404D may prevent the pressure applying device 400 from applying too much pressure onto the cell body 402, such that the cell body 402 would not be hazardous (e.g., burst, explode, and/or the like).

A plurality of first mechanical elements configured to receive a plurality of second mechanical elements may be included in the tray portion 400A of the pressure applying device 400. For example, a plurality of mechanically machined holes or receptacles 406A-406D (e.g., nuts) may be configured to receive screws or bolts 408A-408D. The screws or bolts 408A-408D may uniformly apply pressure onto the cell body 402. Tightening screws or bolts 408A-408D applies more pressure onto the cell body 402 by the tray portion 400A and the cover portion 400B.

A plurality of mechanical members 412A-412D may be connected to screws or bolts 408A-408D. Each of the mechanical members 412A-412D may be connected to a control element. For example, each of the mechanical members 412A-412D may be connected to a rotatable control dial 410 for adjusting the pressure applied onto the cell body 402. In the depicted implementation, the control dial 410 may be configured to apply pressure between 0-40 psi. The control dial 410 may rotate clockwise or counterclockwise to decrease or increase the applied pressure respectively. The control dial 410 may be mechanically connected to the mechanical members 412A-412D, such that rotating the control dial 410 causes the mechanical members 412A-412D to tighten or loosen the screws or bolts 408A-408D based on the rotation. In turn, tightening the screws or bolts 408A-408D may increase the pressure applied onto the cell body 402. Similarly, loosening the screws or bolts 408A-408D may decrease the pressure applied onto the cell body 402. In one implementation, the pressure applied may be between 1-12 psi. In one implementation, the dial may be replaced with a different suitable rotatable mechanism. In one implementation, the dial may be replaced with other mechanical non-rotating mechanisms, such as, a notch or lock system.

The pressure applying devices 200, 300, and 400 may be used to apply pressure to a battery or a battery cell body during operation. In some implementations, the pressure applying devices 200, 300, and 400 may be used to apply pressure to a battery or a battery cell body during processing events. For example, the pressure applying devices 200, 300, and 400 may be used to apply pressure to a battery or a battery cell body during waterproofing processing. In some implementations, batteries or cell bodies of batteries are exposed to vacuum pressure during waterproofing processing. In one implementation, the vacuum pressure to which the battery cell body is exposed is between 10-15 mTorr. The pressure applied by the pressure applying devices 200, 300, and 400 may counter the vacuum pressure or a portion of the vacuum pressure. In some implementations, the applied pressure may be equal or nearly equal to the vacuum pressure. For example, the applied pressure may be between 10-15 psi. The applied pressure may prevent batteries from swelling or getting deformed during waterproofing processing. In some implementations, the waterproofing process may be configured to achieve IPX4 requirements or greater (e.g., IPX6, IPX8, and/or the like).

Computing Device

Figure 5:
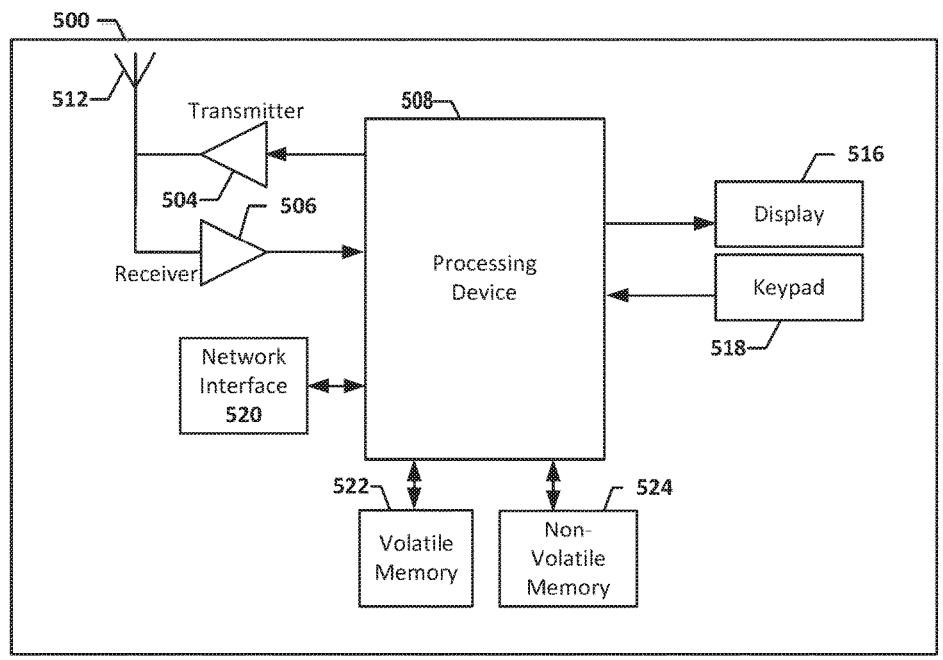
FIG. 5 illustrates an example schematic diagram of a computing device or entity according to one or more example embodiments of the disclosure.

FIG. 5 illustrates an example schematic diagram of a computing device 500 and/or entity according to one or more example embodiments of the disclosurle. In general, the computing device, computer, entity, system, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Computing device 500 can be operated by various parties and/or automatically. As shown in FIG. 5, the computing device 500 can include an antenna 512, a transmitter 504 (e.g., radio), a receiver 506 (e.g., radio), and a processing device 508 (e.g., CPLDs, microprocessors, multi-core processors, coprocessing entities, ASIPs, microcontrollers, and/or controllers) that provides signals to and receives signals from the transmitter 504 and the receiver 506, respectively.

The signals provided to and received from the transmitter 504 and the receiver 506, respectively, may include signaling information in accordance with air interface standards of applicable wireless systems. In this regard, the computing device 500 may be capable of operating with one or more air interface standards, communication protocols, modulation types, and access types. More particularly, the computing device 500 may operate in accordance with any of a number of wireless communication standards and protocols. In a particular embodiment, the computing device 500 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, Wi-Fi Direct, WiMAX, UWB, IR, NFC. Bluetooth, USB, and/or the like. Similarly, the computing device 500 may operate in accordance with multiple wired communication standards and protocols, via a network interface 520.

Via these communication standards and protocols, the computing device 500 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The computing device 500 can also download changes, add-ons, and updates, for instance, to its firmware, software (e.g., including executable instructions, applications, program modules), and operating system.

According to one embodiment, the computing device 500 may include location determining aspects, devices, modules, functionalities, and/or similar words used herein interchangeably. For example, the computing device 500 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, the location information can be determined by triangulating the user computing device 500 position in connection with a variety of other systems, including cellular towers, Wi-Fi access points, and/or the like. Similarly, the computing device 500 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, NFC transmitters, and/or the like. These indoor positioning aspects can be used in a variety of settings to determine the location of someone or something to within inches or centimeters.

The computing device 500 may also comprise a user interface (that can include a display 516 coupled to a processing device 508) and/or a user input interface (coupled to a processing device 508). For example, the user interface may be a user application, browser, user interface, and/or similar words used herein interchangeably executing on and/or accessible via the computing device 500 to interact with and/or cause display of information. The user input interface can comprise any of a number of devices or interfaces allowing the computing device 500 to receive data, such as a keypad 518 (hard or soft), a touch display, voice/speech or motion interfaces, or other input devices. In embodiments including a keypad 518, the keypad 518 can include (or cause display of) the conventional numeric (0-9) and related keys (#, *), and other keys used for operating the computing device 500 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The computing device 500 can also include volatile memory 522 and/or non-volatile memory 524, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile memory can store databases, database instances, database management systems, data, applications, programs, program modules, scripts, source code, object code, byte code, compiled code, interpreted code, machine code, executable instructions, and/or the like to implement the functions of the computing device 500. As indicated, this may include a user application that is resident on the respective device or accessible through a browser or other user interface for communicating with various other computing entities. As will be recognized, these architectures and descriptions are provided for example purposes only and are not limiting to the various embodiments.

Illustrative Processes

Figure 6:
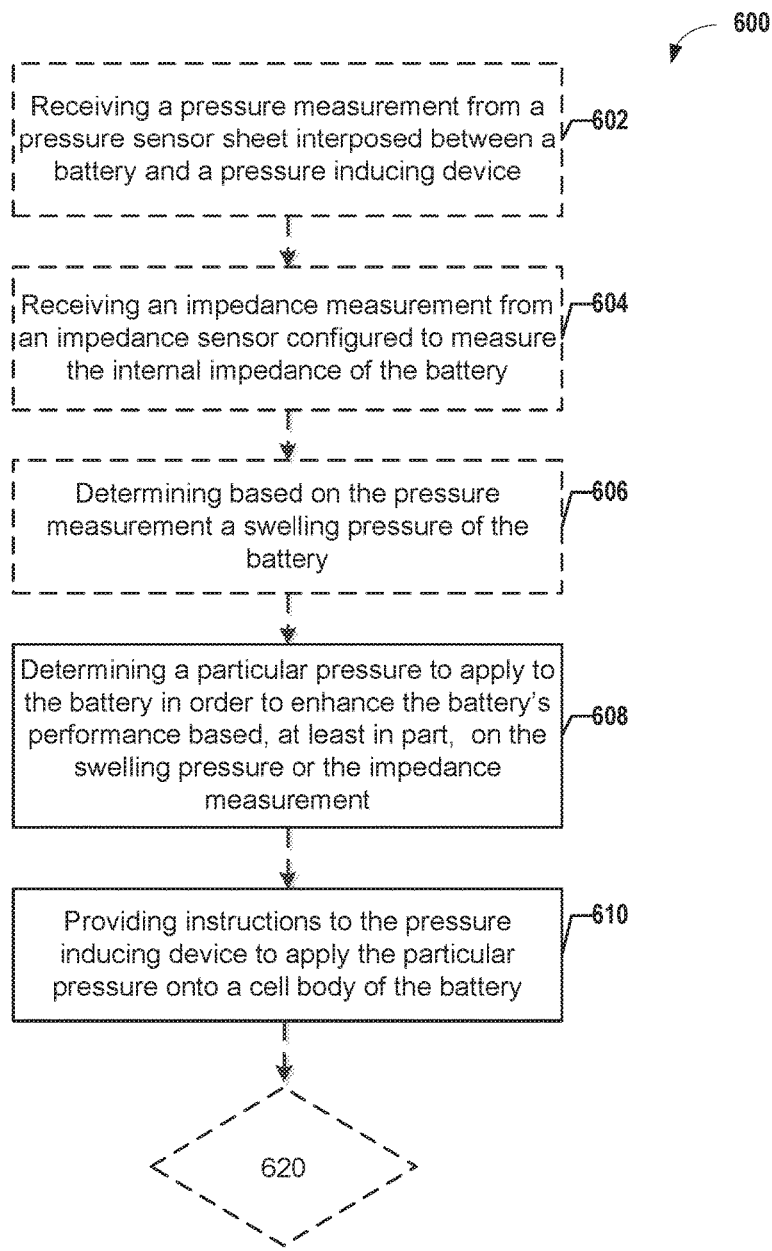
FIGS. 6-8 are flowcharts illustrating various procedures and operations that may be completed in accordance with various embodiments of the disclosure.

FIG. 6 is a flowchart of an example process 600 in accordance with various embodiments of the disclosure. The process 600 may begin with, the optional step shown in phantom of, receiving a pressure measurement from a pressure sensor sheet interposed between a battery and a pressure applying device (602). In one implementation, the pressure sensor sheet may be a flat sensor sheet configured to measure the pressure applied onto the sheet. In some implementations, the sensor sheet may also measure the direction at which the pressure is applied. The sensor sheet may be placed between a member of the pressure applying device (e.g., clamp, tray and cover, and/or the like) and a battery or a cell body of a battery. The pressure sensor sheet may measure the pressure applied by the pressure applying device, the swelling pressure, a combination of the pressure applied by the pressure applying device and the swelling pressure, and/or the like.

The process 600 may continue with the optional step 604, shown in phantom. The process 600 may continue with receiving an impedance measurement from an impedance sensor configured to measure the internal impedance of the battery (604). The impedance sensor may be, for example, an ohm meter, circuitry (e.g., management circuitry) configured to measure the impedance (e.g., bridge), and/or the like. In one implementation, the impedance sensor may be embedded in the protection circuit module of the battery. In some implementations, the impedance sensor may be embedded in the pressure applying device. Yet in other implementations, the impedance sensor may be an external device. For example, the impedance sensor may be within fuel gage hardware and/or software.

The process 600 may continue with optional step 606, shown in phantom. The process 600 may continue with determining based on the pressure measurement a swelling pressure of the battery (606). In some implementations, the sensor sheet may determine the overall pressure applied onto the sensor sheet and/or the battery cell body. The overall pressure may be, for example, a combination of the swelling pressure and the pressure applied by the pressure applying device. The process 600 may determine the swelling pressure of the battery by subtracting the applied pressure from the overall pressure. For example, the measured overall pressure by the sensor sheet may be 7 psi, while the applied pressure may be 5 psi. Accordingly, the swelling pressure may be determined to be 2 psi. In some implementations, the sensor sheet enables differentiating between the applied pressure and the swelling pressure, as discussed. In some implementations, the swelling pressure may be determined according to a linear relationship between the acting forces (e.g., pressure). It should be understood, however, that the swelling pressure may be calculated in a different manner. For example, the calculations may account for energy losses that occur during the mechanical application of pressure.

The process 600 may continue with determining a particular pressure to apply to the battery in order to enhance the battery's performance based, at least in part, on the swelling pressure or the impedance measurement (608). The swelling pressure may be indicative of the age or current status of a battery. For example, a battery that is currently experiencing high levels of swelling pressure may be a battery that is likely to fail soon. However, a battery that experiences low levels of swelling pressure may be battery that is less likely to fail soon. Similarly, the internal impedance of the battery may be also indicative of the battery status or condition. For example, a battery that has higher internal impedance may be a battery that is likely to fail soon, while a battery that has a low internal impedance may be a battery that is less likely to fail soon. In some implementations, having a higher internal resistance may be indicative of performance degradation. The process 600 may determine an overall condition of the battery based on the swelling pressure and/or the internal impedance of the battery. The process 600 then may determine the amount of pressure to apply to the battery based on the condition of the battery. For example, a higher level of pressure may be applied to batteries having high internal impedance or experiencing a high level of swelling. Similarly, a lower level of pressure may be applied to batteries having low internal impedance or experiencing a low level of swelling. Generally, a threshold for high internal impedance may be defined based on the battery type. Similarly, a threshold for low internal impedance may be also defined based on the battery type. In one example, an internal impedance of a lithium ion battery exceeding a threshold of 200 mOhms may be classified as a battery having a high internal impedance. Similarly, the an internal impedance of a lithium ion battery falling below a threshold of 100 mOhms may be classified as a battery having a low internal impedance. Yet in other implementations, a lithium ion battery exceeding a threshold of 150 mOhms may be classified as a battery having a higher internal impedance, while falling below the threshold of 150 mOhms may be classified as a battery having a low internal impedance. Other suitable thresholds may also be used. It should be noted that the "high" and "low" impedance thresholds are dependent on the type and capacity of the battery and will vary for different batteries. One skilled in the art will realize the thresholds described above may be specific to each individual battery or a class of batteries or particular battery chemistries.

A lookup table may be used to determine the amount of pressure to apply onto the battery based on the determined swelling and impedance. A threshold may be defined above which the pressure applying device will stop or halt application of pressure. For example, the combination of applied pressure and swelling pressure may rupture the battery cell body or cause it to burst or explode. In one implementation, the maximum pressure that may be applied by the pressure applying device may be 35 psi and/or the like. In some implementation, the applied pressure is reduced in response to determining that the depth of the battery 104 or 402 exceeds a threshold percentage of the original depth of the battery (e.g., the depth before the battery swelling). For example, the applied pressure may be reduced in response to determining that the swelling of the battery 104 or 402 caused the battery's depth to increase by 10%. In one implementation, a look up table may be used to determine an amount of reduction of the applied pressure. For example, the applied pressure may be reduced from 15 to 12 in response to reaching the 10% threshold. Similarly, the applied pressure may be reduced from 15 to 10 in response to reaching an 11% threshold.

The process 600 may then continue with providing instructions to the pressure applying device to apply the particular pressure onto a cell body of the battery (610). For example, instructions may be provided to a pressure applying device (200, 300, 400, and/or the like) to apply the determined particular pressure onto the cell body of the battery. In some implementations, the instructions may be one or more electric signals and/or computer code segments. The pressure applying device may be configured to receive such signals and, in turn, apply the particular pressure based on the received signal and/or instructions. The block 620 shown in phantom denotes a plurality of other processes that may optionally be implemented with the process 600.

Figure 7:
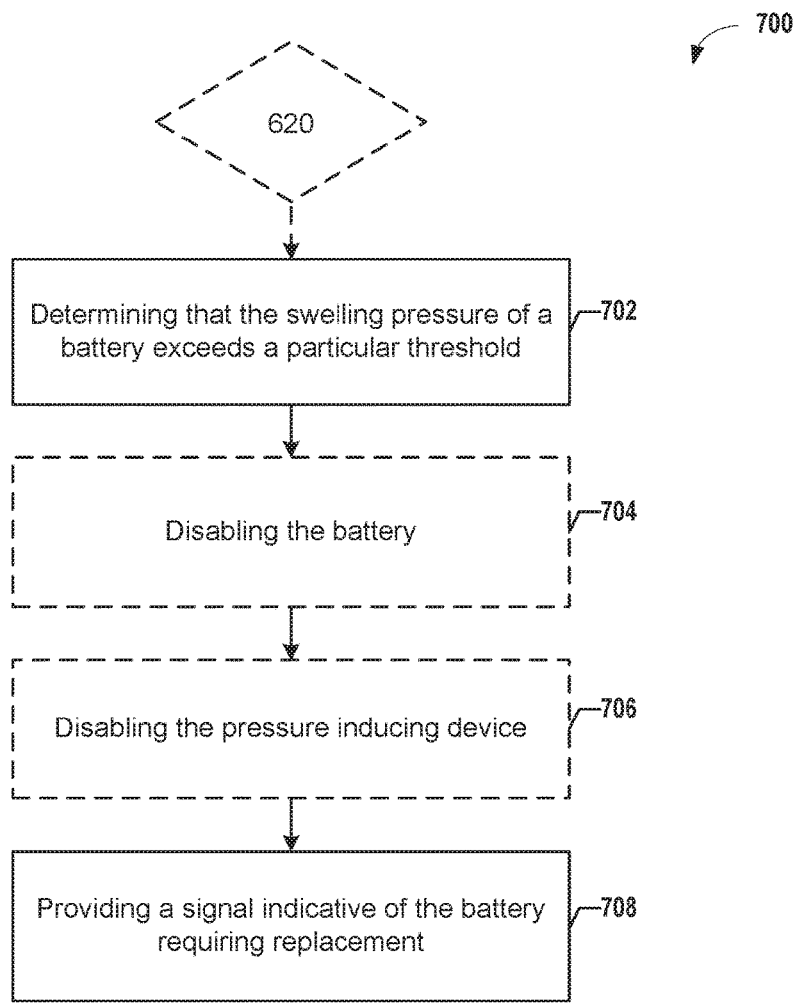

The process 600 may optionally continue with the process 700. FIG. 7 is a flowchart of an example process 700 in accordance with various embodiments of the disclosure. The process 700 may begin with determining that the swelling pressure of a battery exceeds a particular threshold (702). For example, as described above, a pressure sensor sheet may be placed between the pressure applying device and the battery cell body. The measurements from the pressure sensor sheet may be used to determine the swelling pressure of the battery. In turn, the process 700 may determine whether the determined swelling pressure meets or exceeds a particular threshold. The particular threshold may, for example, be defined as a measure of swelling above which the battery is likely to fail and/or degrade the user experience (e.g., hold charge for a very limited time, provide unstable or fluctuating power, and/or the like).

The process 700 may then continue with the optional step 704 shown in phantom. The process 700 may continue with disabling the battery (704). For example, the process 700 may disconnect one or more terminals 107 from a respective electronic device that the battery is powering. The process 700 may then continue with optional step 706 shown in phantom. The process 700 may continue with disabling the pressure applying device (706). For example, the process 700 may disable the pressure applying device such that the device no longer applies pressure onto the battery. Similarly, the process 700 may provide instructions to the pressure applying device to halt or stop applying pressure onto the battery.

In turn, the process 700 may end with providing a signal indicative of the battery requiring replacement (708). For example, the signal may be an LED located on or near the battery that indicates that the battery is failing and is due for replacement. In one implementation, the LED may be located on the pressure applying device. In one implementation, the LED may be located on or within an electronic device powered by the battery. In some implementations, the signal may be an electric signal or code encoded on a signal that provides an indication to an electronic device or a computing entity that the battery is due for replacement. In some implementations, the signal may cause display of image or a visual que. For example. The signal may cause an led light to be activated or a display image, for example, to be read by an eReader.

Figure 8:
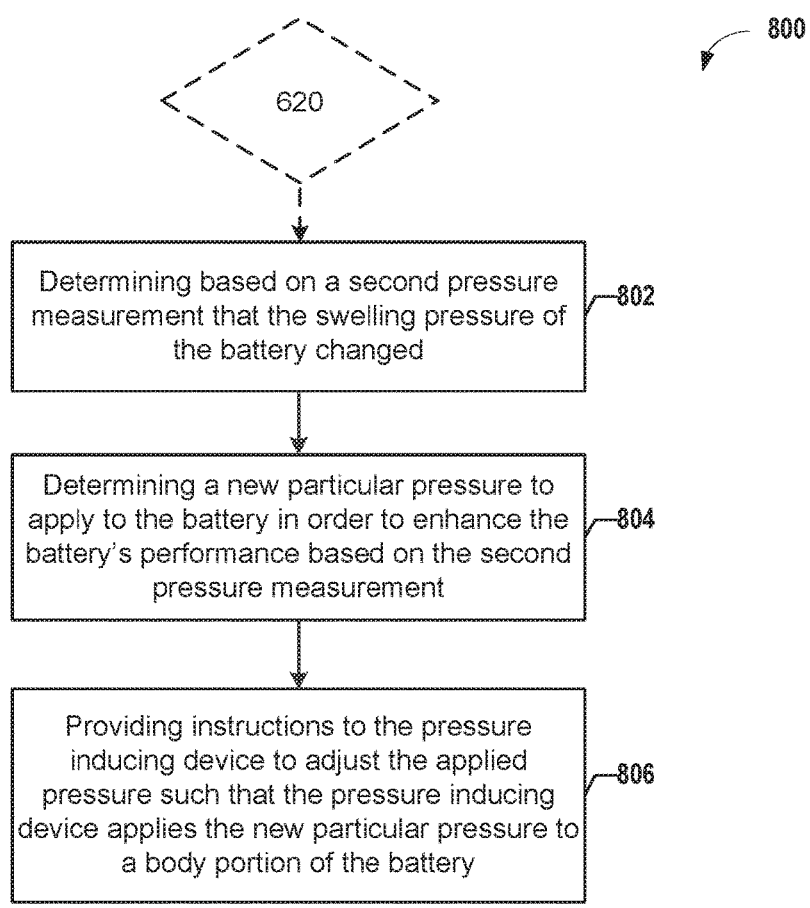

The process 600 may optionally continue with the process 800. FIG. 8 is a flowchart of an example process 800 in accordance with various embodiments of the disclosure. The process 800 may begin with determining based on a second pressure measurement that the swelling pressure of the battery changed (802). For example, the swelling pressure of a battery may increase over time, for example, as the battery ages. The process 800 may determine that the battery swelling pressure increased from 3 psi to 4 psi. The process 800 may then continue with determining a new particular pressure to apply to the battery in order to enhance the battery's performance based on the second pressure measurement (804). For example, the process 800 may determine that the applied pressure is to increase from 12 psi to 13 psi. The process 800 may determine the pressure to be applied based on a lookup table associating the pressure to be applied with the swelling pressure. The lookup table may be determined based on analyzing the batteries performances under different amounts of pressure. For example, various metrics associated with the performance, such as the internal impedance, the power output, the life cycle and/or the like, may be measured and analyzed under different amounts of pressure for different types of batteries. A lookup table may be created for different battery types specifying an optimized or a particular pressure to apply to the battery based on the value of the swelling pressure. For example, swelling pressure created by gas materials may be less than swelling pressure created by solid materials. In one example, the swelling pressure created by gas materials may be below 15 psi. In one example, the swelling pressure created by solid may be greater than 35 psi. The pressure applied may be optimized based on whether the pressure is created by solid or gas materials. For example, the applied pressure may be reduced when a determination is made that the swelling pressure is created by solid materials, to ensure that the applied pressure does not cause the battery to malfunction, burst and/or explode. Generally, applying the particular pressure may increase the life cycle of the battery, decrease the impedance, and increase the power transfer efficiency. Other performance metrics may also be taken into consideration when creating the lookup table. In some implementations, the lookup table may be stored or implemented via circuitry (e.g., management circuitry) of the battery. In some implementations, the lookup table may be stored or implemented by the pressure applying device. In some implementations, the lookup table may be stored or implemented via an electronic device by which the battery is powered. In some implementations, the lookup table may be stored or implanted at a remote computing device in communication with the battery, the electronic device, and/or the pressure applying device.

The process 800 may then end with providing instructions to the pressure applying device to adjust the applied pressure such that the pressure applying device applies the new particular pressure onto a body portion of the battery (806). For example, once the process 800 determines the pressure to be applied based on, for example, the lookup table, the process 800 may provide instructions to the pressure applying device to apply the determined pressure onto the battery. Applying the determined pressure to the battery enhances the performance of the battery as described above. Such pressure may enhance the batteries performances for example, by extending their respective life due to increased electrode stack pressure which prevents electrode delamination and capacity fade problems. The applied pressure may increase the contact between elements of the battery and reduce the effects of the swelling pressure.

It should be understood that the processes, operations, and functionality described above may be performed by or implemented in or by a plurality of systems. For example, the processes, operations, and functionality above may be implemented in batteries, pressure applying devices, battery powered electronic devices, remote management systems, computing entities, and/or the like. The processes, operations, and functionality may be applied to batteries during operation and/or during exposure to vacuum pressure during processing events, such as waterproofing.

It should be noted that the methods above may be modified in various ways in accordance with certain embodiments of the disclosure. For example, one or more operations of the methods above may be eliminated or executed out of order in other embodiments of the disclosure. Additionally, other operations may be added to the methods above in accordance with other embodiments of the disclosure.

Additional Implementation Details

Although an example processing system and/or device has been described above, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on a computer storage medium for execution by, or to control the operation of, information/data processing apparatus. Alternatively, or in addition, the program instructions can be encoded on an artificially generated propagated signal, e.g., a machine-generated electrical, optical, or electromagnetic signal, which is generated to encode information/data for transmission to a suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data including, by way of example, a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing, and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, subprograms, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data. e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network (LAN) and a wide area network (WAN), an inter-network (e.g., the Internet), and peer-to-peer networks (e.g., ad hoc peer-to-peer networks).

The computing system can include clients and servers. A client and server are generally remote from each other and typically interact through a communication network. The relationship of the client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

Conclusion

Many modifications and other embodiments of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A system comprising:
a battery having an elastic shell; and
a pressure applying device having a first pressure applying portion having a plurality of protruding elements defining one or more areas for placing the battery and a second pressure applying portion, wherein the battery is disposed between the first pressure applying portion and the second pressure applying portion of the pressure applying device, and wherein the first pressure applying portion and the second pressure applying portion of the pressure applying device apply a first pressure onto the battery.

2. The system of claim 1, wherein the pressure applying device further comprises a control dial that, when interacted with causes, the first pressure applied onto the battery to change from a first pressure to a second pressure.

3. The system of claim 2, wherein interaction with the element causes the first pressure to be between 1 and 15 psi.

4. The system of claim 1, wherein the pressure is applied onto the battery in a direction parallel to an axis defined by a shortest edge of the battery.

5. The system of claim 1, further comprising:
management circuitry that monitors the battery; and
a sensor interposed between the first pressure applying portion of the pressure applying device and the battery, wherein the management circuitry determines a swelling pressure of the battery based on, at least in part, the first pressure and pressure data received from the sensor.

6. The system of claim 5, wherein the management circuitry disables the battery based, at least in part, on the swelling pressure exceeding a threshold.

7. The system of claim 5, wherein the battery comprises one or more solid electrolyte elements.

8. The system of claim 1, wherein the first pressure applying portion is a tray and the second pressure applying portion is a cover, and wherein the cover detachably couples to the tray such that the cover and the tray apply the first pressure onto the battery.

9. The system of claim 8, wherein the pressure applying device further comprises one or more proximity sensors located adjacent to the protruding elements, and wherein the proximity sensors measure a distance between a closest edge of the battery and to a protruding element from the protruding elements.

10. The system of claim 8, wherein the pressure applying device includes a rotatable mechanism that moves the cover relative to the tray to adjust the first pressure, wherein adjusting the first pressure applies a second pressure onto the battery.

11. The system of claim 5, wherein the system:
determines a first swelling pressure at a first time;
applies the first pressure to the battery at the first time;
determines a second swelling pressure at a second time, the second swelling pressure being different than the first swelling pressure, the second time being subsequent to the first time; and
applies the second pressure to the battery at the second time.

12. The system of claim 5, wherein the management circuitry measures an internal impedance of the battery, and wherein the first pressure is determined based at least in part on, the internal impedance.

13. A method comprising:
receiving a pressure measurement from a sensor interposed between a battery having an elastic shell and a first pressure applying portion of a pressure applying device, the first pressure applying portion having a plurality of elements defining one or more areas for placing the battery, wherein the battery is disposed between the first pressure applying portion and a second pressure applying portion of the pressure applying device;
determining a pressure to apply to the battery based, at least in part, on the pressure measurement; and
providing instructions to the pressure applying device to apply the pressure onto the battery.

14. The method of claim 13, further comprising causing the pressure applied onto the battery to change from a first pressure to a second pressure.

15. The method of claim 14, wherein the second pressure is approximately 15 psi.

16. The method of claim 13, wherein the pressure is applied onto the battery in a direction parallel to an axis defined by a shortest edge of the battery.

17. The method of claim 13, further comprising determining, by management circuity, a swelling pressure of the battery based, at least in part, on the first pressure and pressure data received from the sensor.

18. The method of claim 17, further comprising disabling, by the management circuitry, the battery based, at least in part, on the pressure data indicating a pressure value that exceeds a threshold.

19. The method of claim 13, wherein the battery comprises one or more solid electrolyte elements.

20. The method of claim 13, wherein the first pressure applying portion is a tray and the second pressure applying portion is a cover, and wherein the cover detachably couples to the tray such that the cover and the tray apply the first pressure onto the battery.

* * * * *